United States Patent [19]

Verkhovskiy

[11] Patent Number: 5,796,565
[45] Date of Patent: Aug. 18, 1998

[54] APPARATUS AND METHOD FOR STARTING AND PROTECTING A THREE-PHASE MOTOR

[76] Inventor: Yan Verkhovskiy, 1717 E. Eighth St., Apt. 1R, Brooklyn, N.Y. 11223

[21] Appl. No.: 949,421

[22] Filed: Oct. 14, 1997

Related U.S. Application Data

[63] Continuation-in-part of Ser. No. 756,885, Dec. 2, 1996, abandoned.

[51] Int. Cl.$^6$ ............................................. H02H 5/04
[52] U.S. Cl. ........................... 361/29; 361/77; 361/84; 361/85
[58] Field of Search ........................ 361/23–25, 28–31, 361/33, 102, 78–79, 82–87, 77, 58; 335/7, 9–10, 18, 20–23, 26–28

[56] References Cited

U.S. PATENT DOCUMENTS

| | | | |
|---|---|---|---|
| 3,825,768 | 7/1974 | Grygera | 307/127 |
| 3,838,314 | 9/1974 | Boothman et al. | 317/48 |
| 3,893,009 | 7/1975 | Watson | 317/43 |
| 4,060,843 | 11/1977 | Bost | 361/76 |
| 4,333,119 | 6/1982 | Schoenmeyr | 361/76 |
| 4,347,542 | 8/1982 | Calhoun | 361/76 |
| 4,412,266 | 10/1983 | Niino | 361/24 |
| 4,525,763 | 6/1985 | Hardy et al. | 361/24 |
| 4,890,184 | 12/1989 | Russell | 361/87 |
| 5,184,063 | 2/1993 | Eisenhauer | 324/86 |
| 5,642,249 | 6/1997 | Kuznetsov | 361/58 |

*Primary Examiner*—Jeffrey A. Gaffin
*Assistant Examiner*—Michael J. Sherry
*Attorney, Agent, or Firm*—Biebel & French

[57] ABSTRACT

Apparatus for protecting and starting a three-phase motor uses the three-phase field rotation torque produced by three voltage coils, connected to a three-phase power supply, spaced 120 degrees apart from each other, acting on an aluminum disk having a limited range of rotation. When a start button is pushed connecting the voltage coils in wye configuration, the tendency of the disk to turn is converted to an electrical signal for starting the motor. The apparatus prevents the motor from starting if phase energization is abnormal or phase rotation is not in a predetermined direction. The present apparatus also provides continuous monitoring of the motor with three-phase rotation torque produced by three current coils, which are connected in series with the motor and, in one embodiment, may be wound around the same cores as the voltage coils. The current coils generate torque tending to rotate the disk in the same direction as the torque generated by the voltage coils, thereby maintaining the motor in an energized condition, even after the start button is released. If a phase-failure or phase-reversing condition occurs while the motor is running, the invention deenergizes the motor before the motor overheats and an overload relay trips, thereby prolonging the useful life of the motor.

20 Claims, 10 Drawing Sheets

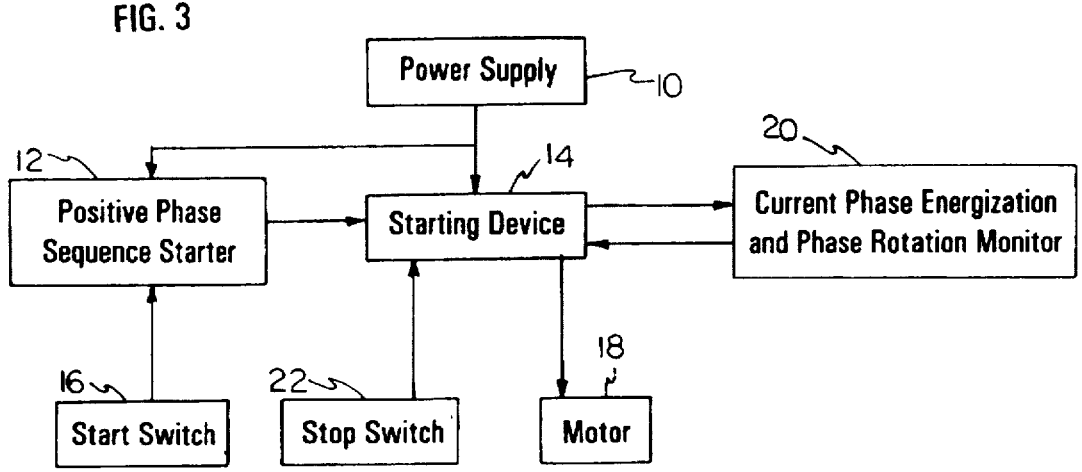
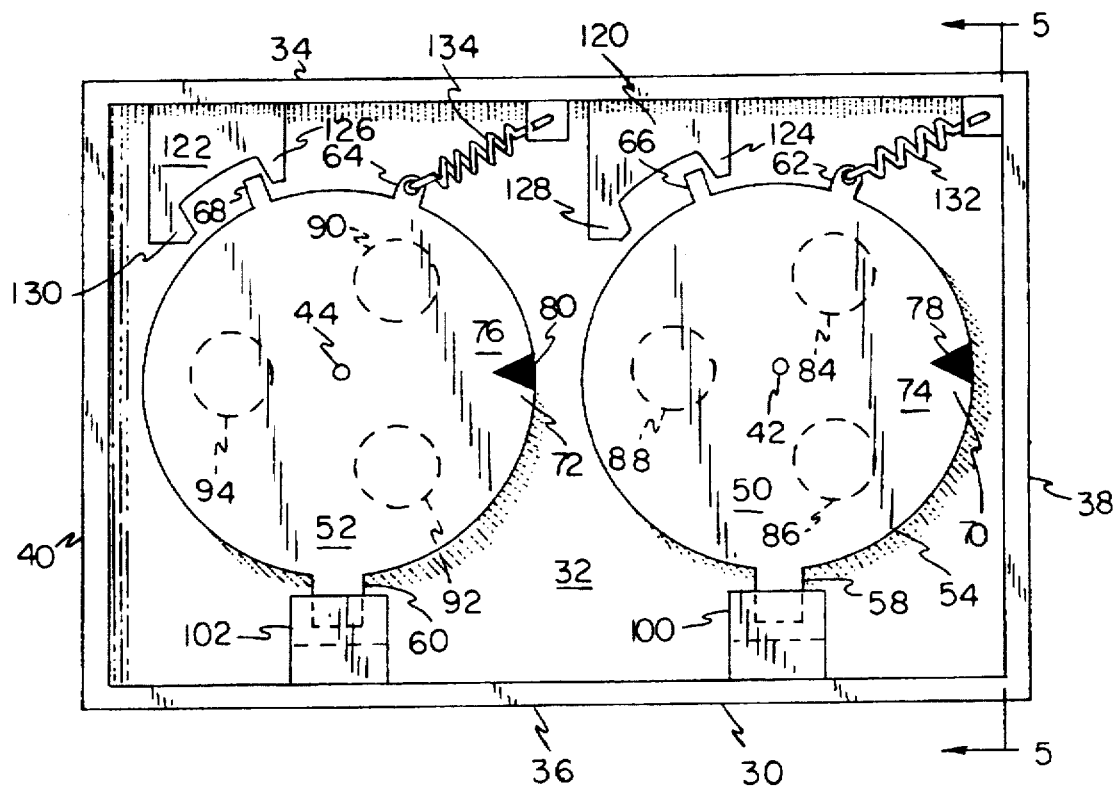

APPARATUS AND METHOD FOR STARTING AND PROTECTING A THREE-PHASE MOTOR

BACKGROUND OF THE INVENTION

The present application is a continuation-in-part of a patent application entitled "Combined Apparatus and Method for Starting and Protecting a Three Phase Motor", Ser. No. 08/756,885, filed 2 Dec. 1996, now abandoned.

The invention relates to AC electrical systems and devices. In particular, it is designed to protect three-phase asynchronous motors.

One of the chief factors limiting electrical motor life is winding insulation degradation caused by repeated overheating. Statistical data show that the insulation of windings "ages" more quickly if it is repeatedly subjected to overheating, even if only for short periods of time. Under these circumstances, the useful life of motors is frequently less than expected.

Many motors are protected only by thermal overload relays. However, motor windings are subjected to overheating during the short time intervals after the occurrence of a failure condition and before the tripping of an overload relay. Thus, useful motor life may be shortened when motors are protected only by overload thermal relays from damage due to failure conditions. Deenergizing motors by means of overload thermal relays is quite normal in cases of mechanical overloading, but is undesirable for motors in a phase-failure condition. A phase-failure condition occurs when one of the power supply lines, or one of the motor windings, opens.

In a phase-failure condition, it is desirable to stop the motor before overheating, but not immediately, because the three phases can sometimes be restored in a short time. For example, a transient phase-failure condition may occur as the result of starting a heavily-loaded single-phase motor fed by the same power grid as the motor to be protected, or as the result of a short circuit on the same power transformer from which the motor is supplied.

One disadvantage of using only overload thermal relays for motor protection is that currents in a delta-connected motor become unbalanced during a phase-failure condition. For example, when one of the phases to a motor operating under load opens, the line current flowing through the thermal relay heaters in the remaining phases may increase by 1.73 times while the phase current flowing through one of the motor windings may double. (See, for example, FIGS. 1 and 2 showing conditions in a three-phase motor before and after a power supply line opens.) Therefore, the winding is subjected to greater overheating and may not be properly protected. A possible solution to this problem is to connect thermal overload heaters in series with each of the motor windings. However, doing so would require six wires running from the overload relays to the motor, which is undesirable.

It is especially hard on a three-phase motor when it is started with only two phases of power supplied to it. This condition is referred to as locked-rotor condition. For example, squirrel-cage motors may draw up to 600% of full-load current during a locked-rotor condition. This may happen, for example, with motors protected from overcurrent conditions by fuses. Such motors are more likely to lose one phase because fuses are single-phase protective devices. Thus, it is desirable to provide independent phase-failure protection for three-phase motors, in addition to overload protection, in order to prolong the useful life of motors.

Phase-failure protective devices that monitor the presence of line voltages or currents are known in the prior art. Some do not provide protection for motors when one wire between the protective device and the motor, including the motor windings, is open-circuited because they do not monitor the current in the line. Protective devices that monitor the current are better able to handle this problem. However, neither of these two types of devices may protect a delta-connected motor when a stator winding is open-circuited because voltages and currents are still present in the supply lines during the fault condition. Also, some protective devices are not designed for delta-connected motors that have a voltage threshold element connected between a common point wye-connected stator and a neutral of a power supply. An example of one such device is disclosed in U.S. Pat. No. 4,525,763 to Hardy et al. Other protective devices are too complicated and expensive to be widely employed in practical usage.

Another problem is that some equipment can be damaged if connected to a motor that starts turning in a direction opposite to that which was intended. This may occur, for example, when the phase rotation sequence of a three-phase electrical power supply becomes reversed. An example of a such device that both tests and protects a three-phase AC motor, or other electrical unit, is disclosed in U.S. Pat. No. 4,412,266 to Niino. One limitation of the device is that it does not prevent starting a motor when the phase rotation sequence is negative or reversed, which may be undesirable for many cases. Both the motor and the power supply to which it is connected should be adequately protected before power is applied to the motor.

There is known a phase-sensitive three-phase indicator, which is most closely related to the present invention. This device is virtually a three-phase microelectrical asynchronous motor. It comprises three coils wound around ferromagnetic cores and spaced 120 degrees apart from each other, and a lightweight aluminum disk on an axle. One lead of each coil is connected to one phase of a power supply line. The other lead of each coil is connected to a start button. When the start button is actuated, the three coils are connected in wye configuration. Current flowing through the three coils produces a rotating magnetic field that produces a torque that turns the disk in a direction corresponding to the phase rotation direction of the three-phase line supply. An indicator mark on the disk provides a visual indication of disk rotation. However, while this device can provide a visual indication of the phase rotation of a line supply, it cannot prevent a motor from starting when the phase rotation sequence is not in a desired direction, and it cannot protect a motor from a phase-failure condition.

It is an object of the present invention to provide an apparatus and method to protect a three-phase motor against the effects of overheating in case of a phase-failure condition, and also to prevent starting the motor when there is negative phase rotation of the power supply.

It is another object of the invention to protect both delta-connected and wye-connected motors.

Yet another object of the invention is to deenergize a motor within a predetermined time interval after a phase-failure condition is detected.

It is a further object of the invention to provide a protective apparatus that is reliable, not complicated, compact, inexpensive, and economical to employ for protecting ordinary three-phase motors.

SUMMARY OF THE INVENTION

The present invention improves on the prior art by providing a positive phase sequence starting control device.

This device allows starting a motor only if all three phases of the power supply are present and phase rotation is in a positive or desired direction.

The positive phase sequence starting control device may comprise: a housing; an aluminum disk mounted for rotation within the housing, the disk having a slot-shutter extending therefrom; three voltage coils disposed adjacent one side of the disk and spaced about 120 degrees apart about the periphery of the disk, each voltage coil having a first lead connected to a respective one phase of a three-phase power supply, each voltage coil having a second lead connected to a terminal of a normally-open start switch; the start switch adapted to place the second leads in electrical connection when actuated, thereby placing the voltage coils in wye configuration; a limiter disposed on the housing adjacent the disk, the limiter having a detent adapted for limiting the angle of rotation of the disk; an optical interrupter disposed on the housing, the interrupter having a light-emitting diode ("LED"), an opto-transistor adapted to detect light emitted from the LED, and a slot between the LED and the opto-transistor adapted to receive therein the slot-shutter when the disk is in a first position; an executive circuit for energizing a coil of a starting device when the opto-transistor detects the light emitted from the LED; and a spring connected between the housing and the disk for automatically returning the disk to the first position.

A second improvement in this invention provides for continuous monitoring of the phase energization and phase rotation of a motor when the motor is running. For this purpose, the apparatus of the present invention additionally has a current phase energization and phase rotation monitor, which may comprise: a housing; an aluminum disk mounted for rotation within the housing, the disk having a slot-shutter extending therefrom; three current coils disposed adjacent one side of the disk and spaced about 120 degrees apart about the periphery of the disk, each current coil having a first lead connected to a respective one phase of a three-phase power supply, each current coil having a second lead connected to a respective stator winding terminal of the motor; a limiter disposed on the housing adjacent the disk, the limiter having a detent adapted for limiting the angle of rotation of the disk; an optical interrupter disposed on the housing, the interrupter having an LED, an opto-transistor adapted to detect light emitted from the LED, and a slot between the LED and the opto-transistor adapted to receive therein the slot-shutter when the disk is in a first position; an output electronic switch connected to the opto-transistor and adapted to maintain the coil of the starting device in an energized condition while the opto-transistor detects light emitted from the LED, and adapted to deenergize the coil of the starting device, after a predetermined time delay, in the event of a phase-failure or a reverse-phase condition; and a spring connected between the housing and the disk for automatically returning the disk to the first position.

BRIEF DESCRIPTION OF THE DRAWINGS

FIG. 3 is a functional block diagram of a first embodiment of the present invention;

FIG. 4 is a simplified front elevation view of the first embodiment of the invention;

DETAILED DESCRIPTION OF THE PREFERRED EMBODIMENT

Figure 1:
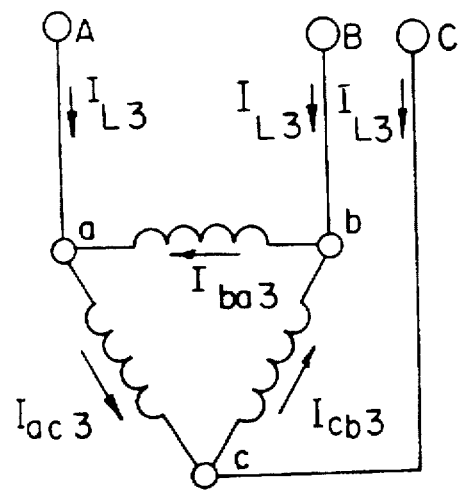
FIG. 1 is a simplified electrical schematic diagram of currents in a normally functioning delta-connected three-phase motor.

Turning first to FIG. 3, a functional block diagram of a first embodiment of the invention is shown. A three-phase electrical power supply 10 having a three-phase rotation sequence supplies electrical power to a positive phase sequence starter 12 and a starting device 14. The starting device 14 is well known in the art and may be of any suitable type such as, for example, a magnetic starter, a contactor, or an electronic starter. A start switch 16 is connected to the positive phase sequence starter 12.

In response to actuation of the start switch 16, the positive phase sequence starter 12 checks the three-phase electrical power from the power supply 10. If the three-phase rotation sequence is in a predetermined direction such as, for example, positive, then the positive phase sequence starter 12 actuates the starting device 14. The starting device 14 in turn provides the three-phase power from the power supply 10 to a three-phase electrical motor 18 and a current phase energization and phase rotation monitor 20. The motor 18 may be of either delta-connected or wye-connected type.

The current phase energization and phase rotation monitor 20 continuously monitors the power from the power supply 10, while the motor 18 is running, to ensure that the power has proper phase energization and proper phase rotation direction. If one or more of the power supply phases is missing, or the phase rotation direction is in an undesired direction such as, for example, negative, then the current phase energization and phase rotation monitor 20 actuates the starting device 14, after a predetermined time delay, to remove power from the motor 18. A stop switch 22 connected to the starting device 14 is also provided to permit manual actuation of the starting device 14 to deenergize the motor 18.

Figure 2:
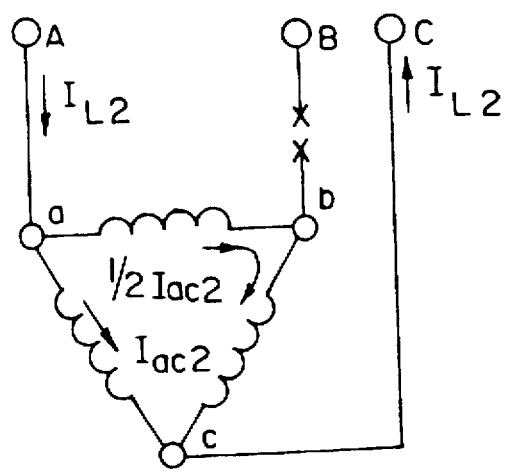
FIG. 2 is a simplified electrical schematic diagram showing currents in a delta-connected three-phase motor having an open power supply line.

Referring now to FIGS. 2-4, there is shown in more detail the first embodiment of the invention. The invention is contained in a housing 30 including a front wall (not shown), a back wall 32, a left side wall 34, a right side wall 36, a top wall 38, and a bottom wall 40. Mounted on the back wall 32 of the housing 30 is a first axle 42 and a second axle 44. A first substantially circular aluminum disk 50 and a second substantially circular aluminum disk 52 are mounted for rotation on the first and second axles 42, 44, respectively. The first and second disks 50, 52 each have extending radially outwardly from a circumferential edge 54, 56 a slot-shutter 58, 60, an eye 62, 64, and a stop 66, 68. Each disk 50, 52 also has disposed on a peripheral edge 70, 72 of a front face 74, 76 an indicator mark 78, 80. The indicator marks 78, 80 are visible through first and second windows (not shown), respectively, in the front wall of the housing 30.

Disposed on the back wall 32 of the housing 30 adjacent a back face 82 of the first disk 50 are three substantially cylindrical voltage coils 84, 86, 88. Each voltage coil 84, 86, 88 has a plurality of turns of wire wound about a ferromagnetic core coaxial with a longitudinal axis of the coil. The voltage coils 84, 86, 88 are disposed substantially equidistant radially outwardly from the first axle 42, about 120 degrees circumferentially apart (substantially equidistant), and with their longitudinal axes disposed substantially perpendicularly to the back face 82 of the first disk 50.

Disposed on the back wall 32 of the housing 30 adjacent a back face (not shown) of the second disk 52 are three substantially cylindrical current coils 90, 92, 94. Each current coil 90, 92, 94 has a plurality of turns of wire wound about a ferromagnetic core coaxial with a longitudinal axis of the coil. The current coils 90, 92, 94, like the voltage coils 84, 86, 88, are disposed substantially equidistant radially outward from the second axle, about 120 degrees circumferentially apart, and with their longitudinal axes disposed substantially perpendicularly to the back face of the second disk 52. The current coils 90, 92, 94 have more turns than necessary for carrying nominal current to provide reliable operation of the present apparatus in case of a motor operating with no load.

Figure 5:
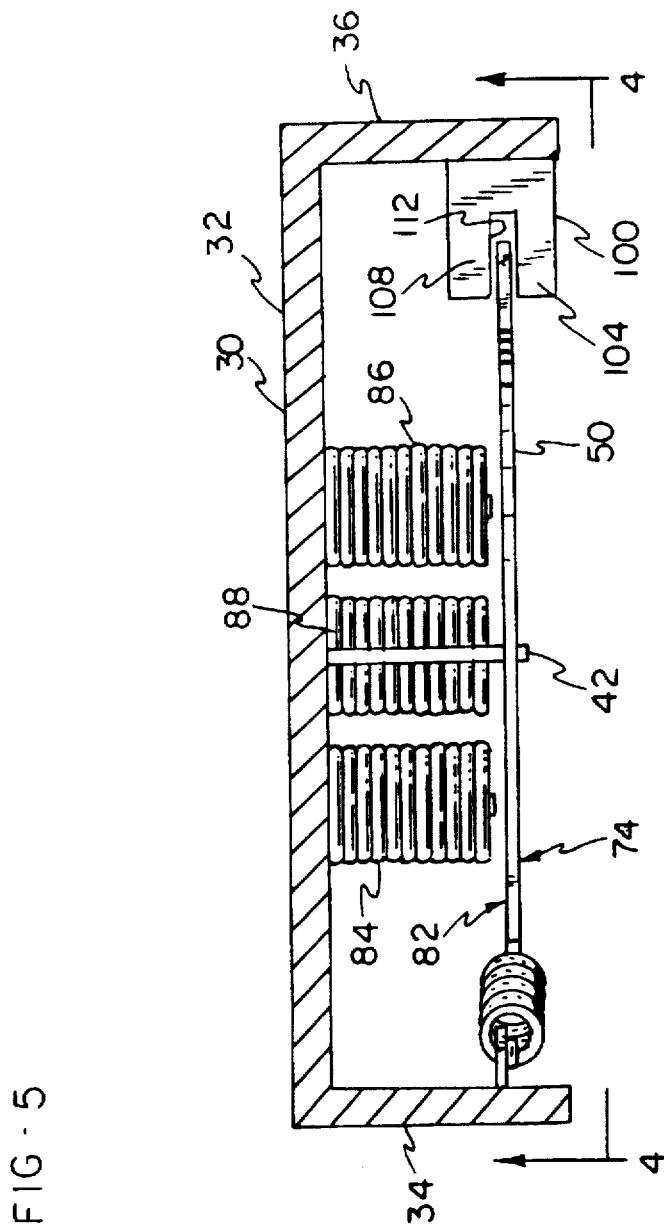
FIG. 5 is a top view of the embodiment shown in FIG. 4.
Figure 6:
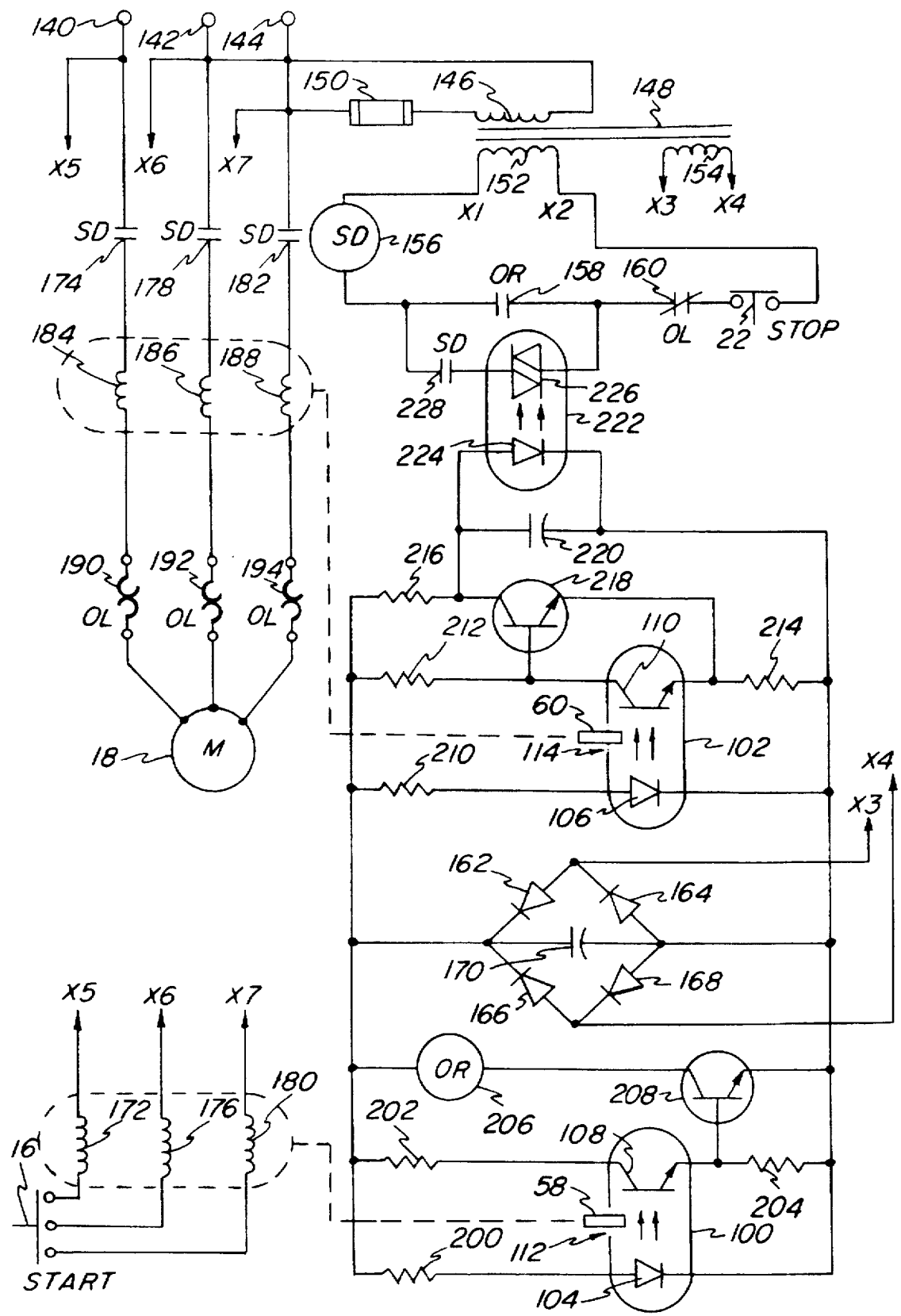
FIG. 6 is an electrical schematic diagram of a control circuit of the first embodiment of the invention.

Disposed on the right side wall 36 of the housing 30 are first and second interrupters 100, 102. As shown in FIGS. 5 and 6, each interrupter 100, 102 includes an LED 104, 106 for emitting light, an opto-transistor 108, 110 for detecting the light emitted by its respective LED 104, 106, and a slot 112, 114 separating the LED 104, 106 from the opto-transistor 108, 110 by a predetermined distance. Suitable interrupters are opto-coupled interrupter modules Type ECG Series 3100 available from Philips ECG, Inc., of Greeneville, Tenn. The first and second interrupters 100, 102 are disposed substantially radially outwardly from the circumferential edges 54, 56 of the first and second disks 50, 52, respectively. The slot 112 of the first interrupter 100 is adapted to lie in the same plane as the first slot-shutter 58, and to receive the first slot-shutter 58 therein when the first disk 50 is in a first angular position (as shown in FIG. 4). When the first disk 50 is in the first angular position, the first slot-shutter 58 substantially blocks the light from the LED 104 to the opto-transistor 108.

Likewise, the slot 114 of the second interrupter 102 is adapted to lie in the same plane as the second slot-shutter 60, and to receive the second slot-shutter 60 therein when the second disk 52 is in a first angular position (as shown in FIG. 4). When the second disk 52 is in the first angular position, the second slot-shutter 60 substantially blocks the light from the LED 106 to the opto-transistor 110.

Disposed on the left side wall 34 of the housing 30 is a first limiter 120 associated with the first disk 50, and a second limiter 122 associated with the second disk 52, for limiting the range of angular motion of their respective disks. Each limiter 120, 122 has a first detent 124, 126 and a second detent 128, 130 that cooperate with the stops 66, 68 to limit the range of motion. When the disks 50, 52 are in the first angular position, the stops 66, 68 are in abutment with the first detents 124, 126. When the disks 50, 52 have rotated in a desired direction to the fullest extent of their range, the stops 66, 68 are in abutment with the second detents 128, 130.

First and second springs 132, 134, associated with the first and second disks 50, 52, respectively, have one end disposed on the left side wall 34 of the housing 30, and a second end attached to the ears 62, 64 of their respective disks 50, 52. The springs 132, 134 automatically return the disks 50, 52 to the first angular position, when no torque is acting upon them.

Referring more particularly to FIG. 6, there may be seen an electrical schematic diagram of the invention. Each of the three power supply line phases is connected to one of the three input terminals 140, 142, 144. Between two of the phases is connected the primary winding 146 of a transformer 148 in series with a fuse 150. The primary winding 146 of the transformer 148 couples the phase-to-phase input power to a first secondary winding 152 having a first output terminal X1 and a second output terminal X2, and a second secondary winding 154 having a first output terminal X3 and a second output terminal X4.

In series connection with the first output terminal X1 and the second output terminal X2 of the first secondary winding 152 are a starting device relay coil 156, a normally open output relay contact 158, a normally closed overload relay contact 160, and a normally closed pushbutton stop switch 22.

Connected between the first output terminal X3 and the second output terminal X4 of the second secondary winding 154 are four full-wave bridge rectifier diodes 162, 164, 166, 168 and a filter capacitor 170.

The first input terminal 140 is connected to a first lead of a first voltage coil 172, and a first lead of a first normally open starting relay contact 174. The second input terminal 142 is connected to a first lead of a second voltage coil 176 and a first lead of a second normally open starting relay contact 178. The third input terminal 144 is connected to a first lead of a third voltage coil 180 and a first lead of a third normally open starting relay contact 182. A second lead of each voltage coil 172, 176, 180 is connected to a terminal of a normally open pushbutton start switch 16. When the start switch 16 is closed, the second lead of each voltage coil 172, 176, 180 is connected to the second leads of the other voltage coils, thereby placing the voltage coils 172, 176, 180 in wye configuration.

A second lead of each of the three normally open starting relay contacts 174, 178, 182 is connected to a respective first lead of each of three current coils 184, 186, 188. A second lead of each of the three current coils 184, 186, 188 is connected to a respective first lead of each of three normally closed overload relay heaters 190, 192, 194. A second lead of each of the three overload relay heaters 190, 192, 194 is connected to one of three respective input terminals on a motor 18. Thus, each of the normally open starting relay contacts 174, 178, 182, the current coils 184, 186, 188, and the overload relay heaters 190, 192, 194 forms a series input circuit for each of the three input phases to the motor 18.

The full-wave bridge rectifier 162, 164, 166, 168 and the filter capacitor 170 supply filtered d.c. power to the executive circuitry of the positive phase sequence starter 12 and the current phase energization and phase rotation monitor 20. The positive phase sequence starter 12 includes resistors 200, 202, 204, the interrupter 100 having the LED 104 and the opto-transistor 108, the first slot-shutter 58, an output relay coil 206 and a switching transistor 208. The resistor 200 limits the current to the LED 104 of the first interrupter 100. The resistor 202 limits the current to the opto-transistor 108 of the first interrupter 100. The resistor 204 establishes proper d.c. bias voltages for the switching transistor 208. The first slot-shutter 58 selectively interrupts the light path from the LED 104 to the opto-transistor 108 of the first interrupter 100. The switching transistor 208, when biased on, permits the output relay coil 206 to be energized.

The current phase energization and phase rotation monitor 20 includes resistors 210, 212, 214, and 216, the second interrupter 102 having the LED 106 and the opto-transistor 110, the second slot-shutter 60, a second switching transistor 218, a time delay capacitor 220, and an optoisolator 222 having an LED 224 and a bidirectional diode switch or triac 226. A suitable optoisolator may be a Type ECG 3047 or 3048 optoisolator available from Philips ECG, Inc. The resistor 210 limits the current to the LED 106 while the resistors 212, 214, and 216 establish the proper bias voltages for, and limit the currents to, the opto-transistor 110 and the second switching transistor 218. The second slot-shutter 60 selectively interrupts the light path from the LED 106 to the opto-transistor 110. The second switching transistor 218, when off, permits the time delay capacitor 220 to charge to a predetermined voltage, and the LED 224 to energize. Connected in series with the triac 226 is a normally open starting device relay contact 228.

Figure 7:
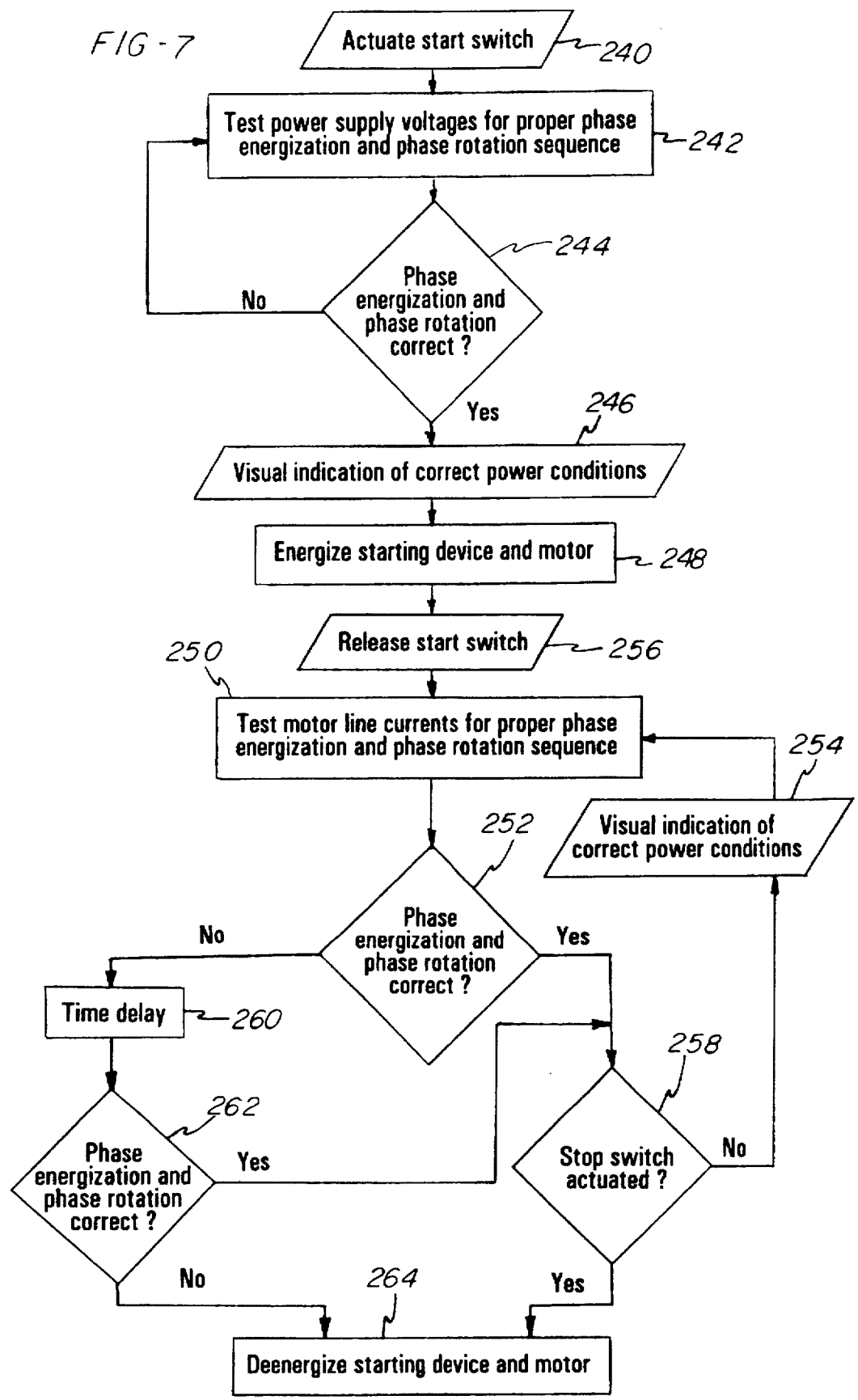
FIG. 7 is a logic diagram representing the operation of the apparatus and the method in accordance with the first embodiment of the invention.

Referring now to FIG. 7, there is shown a logic diagram of an embodiment of the method of the instant invention. The start switch 16 is actuated to an on position in a start step 240, thereby connecting the voltage coils 172, 176, 180 in wye configuration.

While the voltage coils 172, 176, 180 are connected in wye configuration, the line voltages of the three-phase electrical power supply 10 are tested in a power supply phase energization and a phase sequence testing step 242. If each of the line supply phase voltages is present and the phase sequence is in the correct predetermined direction (step 244), then the torque produced by the magnetic fields generated by the voltage coils 172, 176, 180 acting on the first disk 50 will cause the first disk 50 to turn in a first direction. As a result, the first slot-shutter 58 will rotate out of the light path from the first interrupter LED 104 to the opto-transistor 108. Also, the indicator mark 78 appearing in the first window will rotate out of sight, thereby providing a visual indication of proper phase energization and phase rotation sequence (step 246).

While light from the LED 104 shines on the opto-transistor 108, the opto-transistor 108 is energized and acts like a switch, applying a turn-on voltage to switching transistor 208. Switching transistor 208, while energized, completes a conduction path for the output relay coil 206, thereby causing the output relay coil 206 to energize and close the normally open output relay contact 158. The closing of the output relay contact 158 completes the circuit for energizing the starting device relay coil 156. The energized starting device relay closes the starting device relay contacts 174, 178, 182, thereby applying the three line supply phase voltages to the motor 18 through the current coils 184, 186, 188 and the overload relay heaters 190, 192, 194, and closing the normally open starting device relay contact 228 in series with the triac 226. The motor starts (step 248).

Once the current coils 184, 186, 188 are energized, testing of the current phase energization and phase rotation begins (step 250). If the current coils 184, 186, 188 are properly energized and the phase rotation is in the proper direction (step 252), then the energized current coils 184, 186, 188 produce a torque that tends to turn the second disk 52 in a first direction. As a result, the second slot-shutter 60 rotates out of the light path from the second interrupter 102 LED 106 to the opto-transistor 110. Also, the indicator mark 80 appearing in the second window rotates out of sight, thereby providing a visual indication of proper phase energization and phase rotation sequence (step 254).

While the light from the LED 106 shines on the opto-transistor 110, the opto-transistor 110 is energized and acts like a switch, short-circuiting the base and emitter of the switching transistor 218, thereby turning off the transistor 218. With the switching transistor 218 off, the time-delay capacitor 220 charges to a predetermined voltage and the LED 224 in the optoisolator 222 turns on, thereby triggering the triac 226 into conduction. The conducting triac 226, in series with the now closed starting device relay auxiliary contact 228, forms a bypass circuit around the closed output relay contact 158 to provide an alternate path for maintaining the starting device relay coil 156 in an energized state.

Once the motor 18 is running, the start switch 16 is released to disconnect the voltage coils 172, 176, 180 from wye configuration (step 256). The first spring 132 acts on the first disk 50 to restore the first disk 50 to its first position. The first slot-shutter 58 interrupts the light path from the LED 104 to the opto-transistor 108, thereby turning off the opto-transistor 108. The switching transistor 208 then turns off, deenergizing the output relay coil 206, and causing the output relay contact 158 to open.

So long as the stop switch 22 is not actuated (step 258), the overload relay contact 160 remains closed, and the power supply phase energization and phase rotation are as desired, the starting device relay coil 156 remains energized and power is supplied to the motor 18.

In the event that one or more of the phase voltages disappear while the motor 18 is running, the corresponding current coils 184, 186, 188 are deenergized. The remaining current coils 184, 186, 188 cease to produce a torque that tends to rotate the second disk 52 in the first direction. The second spring 134 then acts on the second disk 52 to return the disk 52 to the first position.

In the event that the phase rotation sequence reverses, the current coils 184, 186, 188 produce a torque that acts to rotate the second disk 52 in a reverse direction and return the disk 52 to the first position.

When the second disk 52 returns to the first position, the second slot-shutter 60 interrupts the light path from the LED 106 to the opto-transistor 110, thereby turning off the opto-transistor 110. The switching transistor 218 turns on, thereby providing a path for the time-delay capacitor 220 to discharge through the transistor 218 and the resistor 214 (step 260). If the phase energization or phase rotation condition that caused the switching transistor 218 to turn on does not abate within a predetermined time (step 262), say, for example, one to three seconds, then the time delay capacitor 220 discharges to a voltage level wherein the optoisolator LED 224 turns off. In turn, the triac 226 switches off, thereby deenergizing the starting device relay coil 156 and causing the starting device relay contacts 174, 178, 182, 228 to open. Power to the motor 18 is thereby removed, thus protecting the motor 18 from further possible damage.

Figure 8:
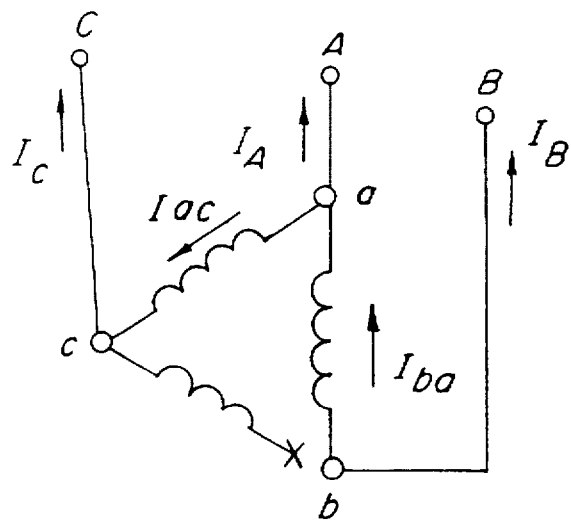
FIG. 8 is a simplified electrical schematic diagram of a delta-connected three-phase motor having one stator winding open-circuited.
Figure 9:
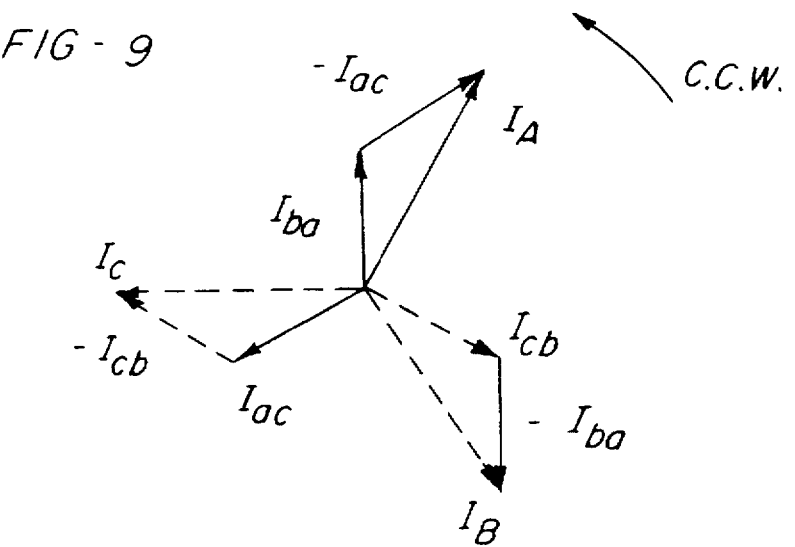
FIG. 9 is a current vector diagram showing currents in the motor of FIG. 8 before the stator winding is open-circuited.
Figure 10:
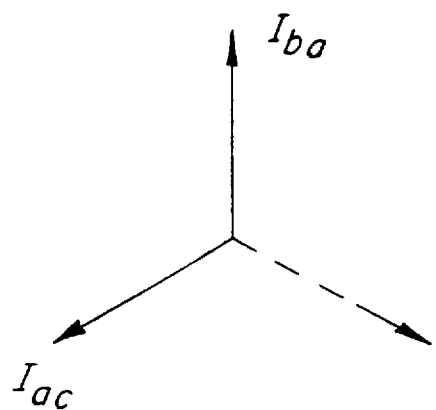
FIG. 10 is a current vector diagram showing the loss of current in the open-circuited winding is the motor of FIG. 8.
Figure 11:
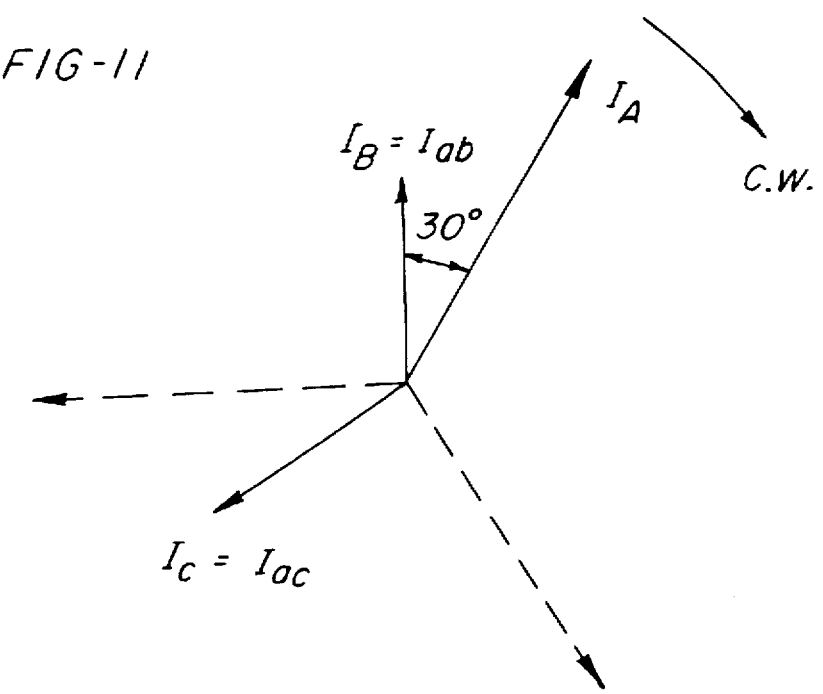
FIG. 11 is a current vector diagram showing currents in the motor of FIG. 8 after the stator winding is open-circuited.

Referring now to FIGS. 8–11, it may be seen how the present invention provides protection for a delta-connected three-phase motor in the event of an open-circuited winding. In FIG. 8, a stator winding is depicted with an open-circuit condition. FIGS. 9–11 show how the current vector $I_B$, which lags current vector $I_A$ by 120 degrees before the stator winding is open-circuited, changes direction and leads current vector $I_A$ by 30 degrees after the stator winding is open-circuited. Thus, the phase rotation sequence in the current phase energization and phase rotation monitor changes 20 from A, B, C to A, C, B. The torque produced by the current coils 184, 186, 188 reverses and tends to turn the second disk 52 in an opposite direction. However, the second limiter 122 and its first detent 126 prevent negative rotation of the second disk 52 beyond the first position.

Figure 12:
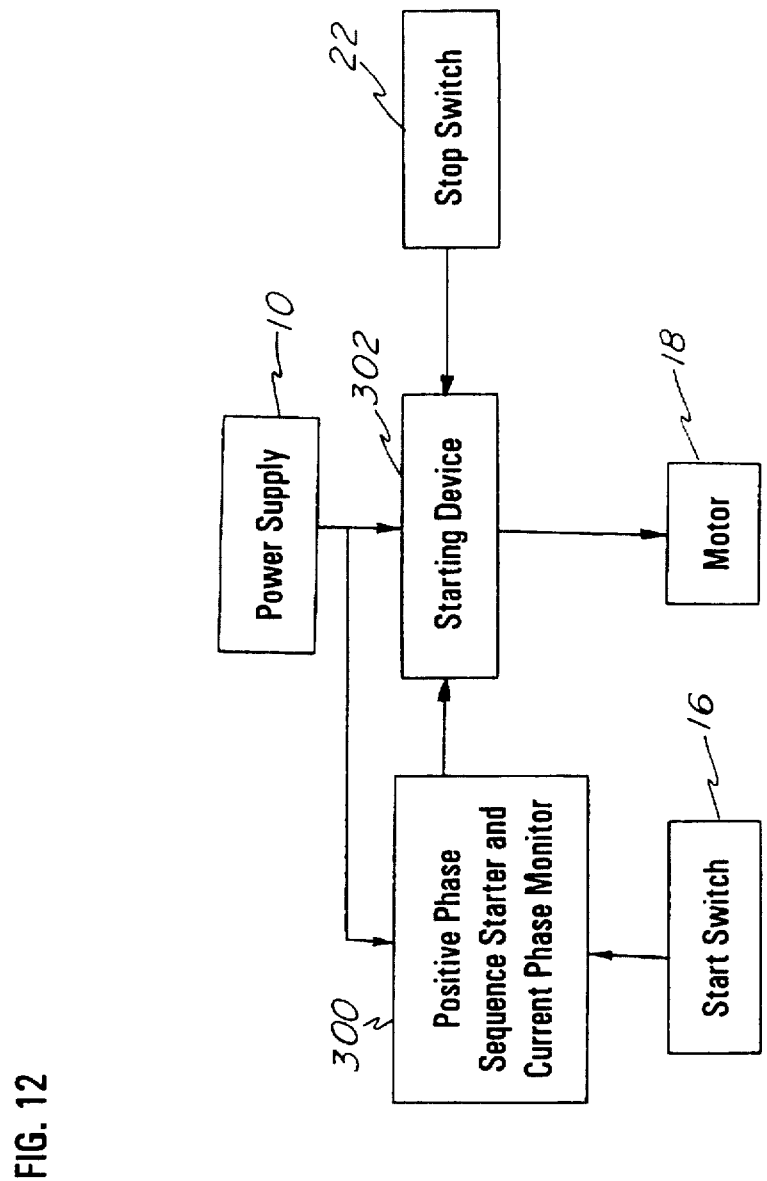
FIG. 12 is a functional block diagram of a second embodiment of the invention.

Turning now to FIG. 12, there is shown a functional block diagram of a second embodiment of the invention. A three-phase electrical power supply 10 having a three-phase rotation sequence supplies electrical power to a positive phase sequence starter and current phase monitor 300, and a starting device 302. A start switch 16 is connected to the positive phase sequence starter and current phase monitor 300 for initiating a start sequence. The starting device 302 is connected to a three-phase motor 18 for delivering power to the motor 18 under control of the positive phase sequence starter and current phase monitor 300. A stop switch 22 is connected to the starting device 302 for deenergizing the starting device 302 and interrupting power to the motor 18.

Similarly to the first embodiment, in response to actuation of the start switch 16, the positive phase sequence starter and current phase monitor 300 checks the three-phase electrical power from the power supply 10 for proper phase energization and phase rotation sequence. If the power is as desired, the positive phase sequence starter and current phase monitor 300 energizes the starting device 302, which in turn applies the power to the motor 18. The positive phase sequence starter and current phase monitor 300 continuously monitors the power to the motor 18 while the motor 18 is operating. If one or more power supply phases is no longer present, or if the phase rotation sequence reverses, then the positive phase sequence starter and current phase monitor 300 deenergizes the starting device 302, unless the power returns to normal within a predetermined time. The stop switch 22 permits manual deenergization of the starting device 302 to remove power to the motor 18 at any time.

Figure 13:
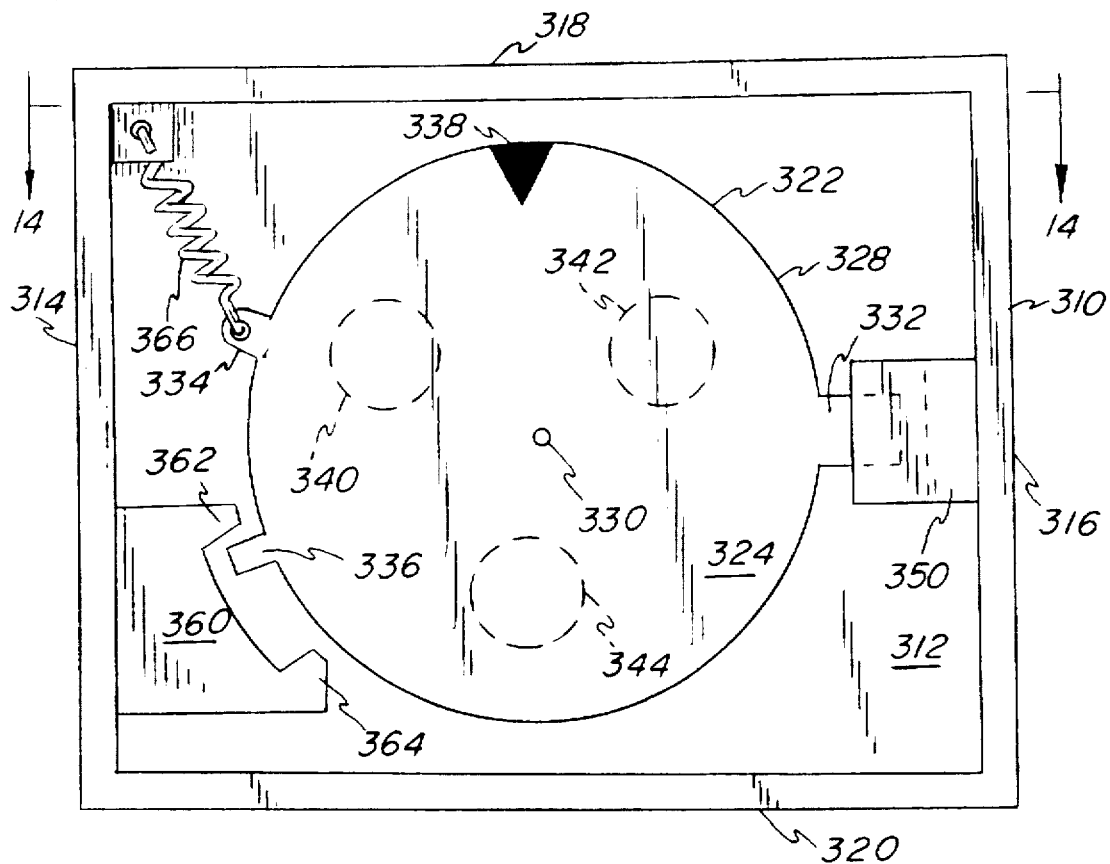
FIG. 13 is a simplified front elevation view of the second embodiment of the invention.
Figure 14:
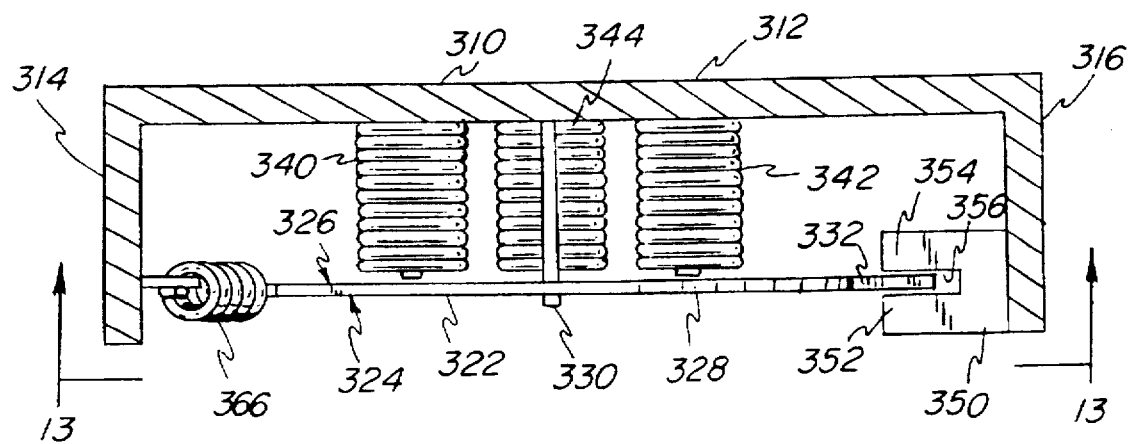
FIG. 14 is a top view of the invention shown in FIG. 13.

Referring now to FIGS. 13 and 14, there is shown in more detail the second embodiment of the invention. The invention is contained in a housing 310 including a front wall (not shown), aback wall 312, a left side wall 314, a right side wall 316, a top wall 318, and a bottom wall 320. A substantially circular aluminum disk 322 including a front face 324, a back face 326, and a circumferential edge 328 is mounted for rotation on an axle 330 disposed perpendicularly to the back wall 312. A slot-shutter 332, an eye 334, and stop 336 extend radially outwardly from the circumferential edge 328 of the disk 322. An indicator mark 338 is disposed on the front face 324 of the disk 322 adjacent the circumferential edge 328 for providing a visual indication of the angular position of the disk 322 and is adapted to be visible through a window (not shown) disposed in the front wall of the housing 310.

Disposed on the back wall 312 of the housing 310 adjacent the back face 326 of the disk 322 are three substantially cylindrical coils 340, 342, 344 each having a longitudinal axis. Each coil 340, 342, 344 has two windings, a voltage winding and a current winding, coaxially wound around a common bobbin and ferromagnetic core. Each winding has two terminal connections. The voltage windings include a relatively large number of turns of a relatively small gauge wire, while the current windings include a relatively small number of turns of a relatively large gauge wire. The numbers of turns and gauges of wire are chosen in accordance with design principles well known in the art so as to permit the windings to accommodate expected levels of power supply voltages and motor currents. The coils 340, 342, 344 are disposed substantially equidistant radially outwardly from the axle 330, about 120 degrees circumferentially apart, and with their longitudinal axes disposed substantially perpendicularly to the back face 326 of the disk 322.

Disposed on the right side wall 316 of the housing 310 is an interrupter 350 for sensing rotational movement of the disk 322. The interrupter 350 includes an LED 352 for emitting light, an opto-transistor 354 for detecting the light emitted by the LED 352, and a slot 356 separating the LED 352 from the opto-transistor 354 by a predetermined distance. The interrupter 350 is disposed substantially radially outwardly from the circumferential edge 328 of the disk 322 such that the slot 356 is adapted to lie in the same plane as the slot-shutter 332, and to receive the slot-shutter 332 therein when the disk 322 is in a first angular position (as shown in FIG. 13). The slot-shutter 332 substantially blocks the light from the LED 352 to the opto-transistor 354 when the disk 322 is in the first angular position.

A limiter 360 is disposed on the left side wall 314 of the housing 310 for limiting the range of angular motion of the disk 322. The limiter 360 includes a first detent 362 and a second detent 364 that cooperate with the stop 336 to limit the range of motion. When the disk 322 is in the first angular position, the stop 336 is in abutting relation with the first detent 362, and when the disk 322 has rotated in a desired direction to the fullest extent of its range, the stop 336 is in abutting relation with the second detent 364.

A spring 366 for automatically returning the disk 322 to the first position has a first end disposed on the left side wall 314 of the housing 310 and a second end attached to the eye 334 of the disk 322.

Figure 15:
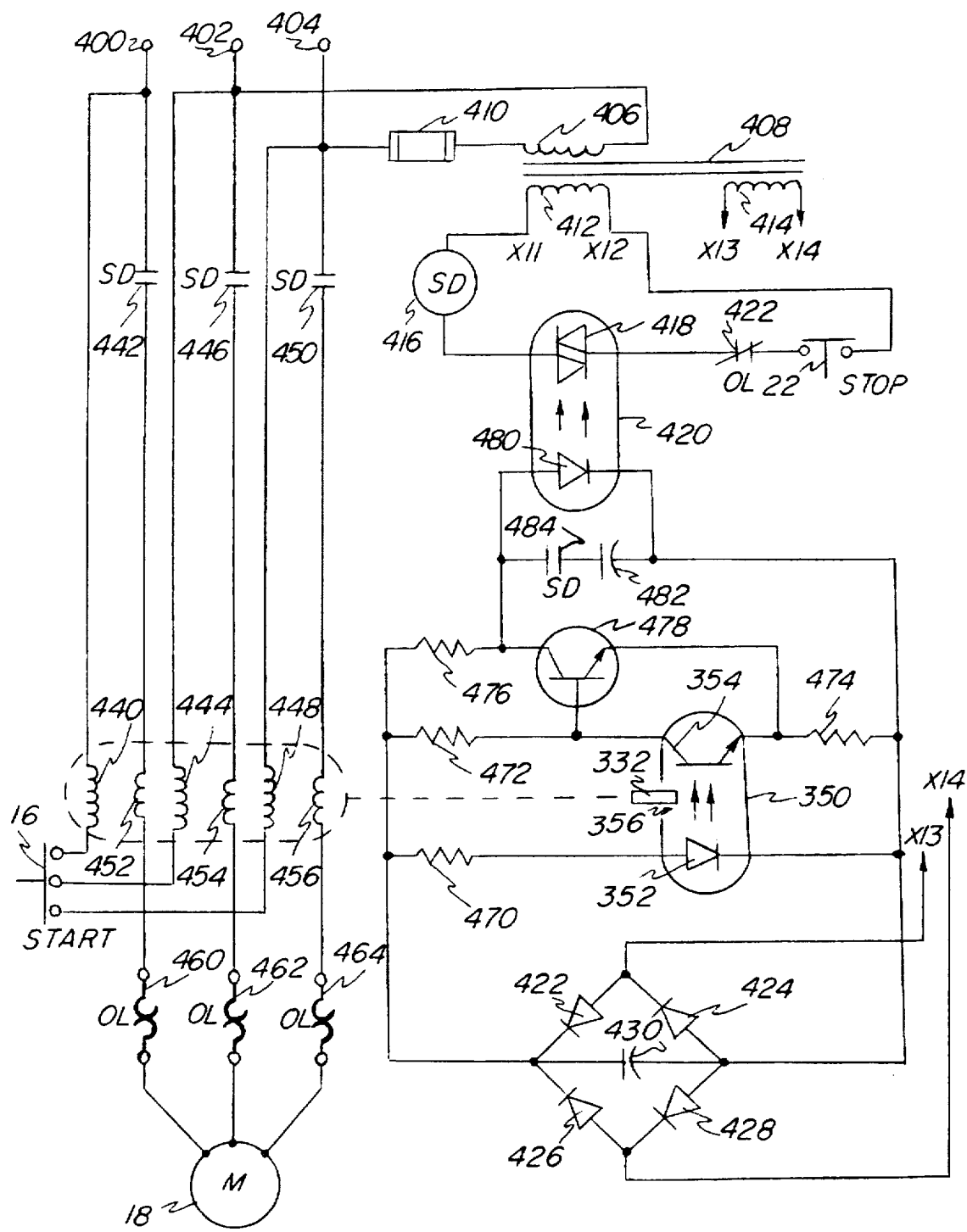
FIG. 15 is an electrical schematic diagram of a control circuit of the second embodiment the invention.

Referring more particularly to FIG. 15, there may be seen an electrical schematic diagram of the second embodiment of the instant invention. Each of the three power supply line phases is connected to one of three input terminals 400, 402, 404. Between two of the phases is connected the primary winding 406 of a transformer 408 in series with a fuse 410. The primary winding 406 of the transformer 408 couples the phase-to-phase input power to a first secondary winding 412 having a first output terminal X11 and a second output terminal X12, and a second secondary winding 414 having a first output terminal X13 and a second output terminal X14.

In series connection with the first output terminal X11 and the second output terminal X12 of the first secondary winding 412 are a starting device relay coil 416, a triac 418 of an optoisolator 420, a normally closed overload relay contact 422, and a normally closed pushbutton stop switch 22.

Connected between the first output terminal X13 and the second output terminal X14 of the second secondary winding 414 are four full-wave bridge rectifier diodes 422, 424, 426, 428 and a filter capacitor 430 for providing a d.c. voltage.

The first input terminal 400 is connected to the first lead of the voltage winding 440 of the first coil 340, and a first lead of a first normally open starting device relay contact 442. The second input terminal 402 is connected to the first lead of the voltage winding 444 of the second coil 342 and a first lead of a second normally open starting device relay contact 446. The third input terminal 404 is connected to the first lead of the voltage winding 448 of the third coil 344 and a first lead of a third normally open starting device relay contact 450. A second lead of each voltage winding 440, 444, 448 of each coil 340, 342, 344 is connected to a terminal of a normally open pushbutton start switch 16. When the start switch 16 is closed, the second lead of each voltage winding 440, 444, 448 is electrically connected to the second leads of the other voltage windings, thereby placing the voltage windings 440, 444, 448 in wye configuration.

A second lead of each of the three normally open starting device relay contacts 442, 446, 450 is connected to a respective first lead of each of the three current windings 452, 454, 456 of the three coils 340, 342, 344. A second lead of each of the three current windings 452, 454, 456 is connected to a respective first lead of each of three normally closed overload relay heaters 460, 462, 464. A second lead of each of the three overload relay heaters 460, 462, 464 is connected to one of three respective input terminals of the motor 18. Thus, each of the normally open starting device relay contacts 442, 446, 450, the current windings 452, 454, 456, and the overload relay heaters 460, 462, 464 forms a series input circuit for each of the three input phases to the motor 18.

The full-wave bridge rectifier 422, 424, 426, 428 and the filter capacitor 430 supply filtered d.c. power to the circuitry of the positive phase sequence starter and current phase monitor 300. A resistor 470 in series with the interrupter LED 352 limits current through the LED 352. Resistors 472, 474, 476 establish the proper bias voltages for, and limit currents to, the interrupter opto-transistor 354 and a switching transistor 478. The slot-shutter 332 selectively interrupts the light path from the interrupter LED 352 to the opto-transistor 354. Resistor 476 also limits the current through an LED 480 of the optoisolator 420. The optoisolator LED 480 selectively switches on the triac 418. In parallel connection with the optoisolator LED 480 is a time-delay capacitor 482 in series with a fourth normally open starting device relay contact 484.

Referring now to FIGS. 7, 12–15, the method of operation of the second embodiment of the invention may be seen. The start switch 16 is first actuated to an on position, thereby connecting the three voltage windings 440, 444, 448 in wye configuration. While the voltage windings 440, 444, 448 are connected in wye configuration, the line voltages of the three-phase electrical power supply 10 are tested for proper phase energization and phase rotation sequence. If each of the line supply phase voltages is present and the phase sequence is in a predetermined direction, then the torque produced by the magnetic fields of the voltage windings 440, 444, 448 acts on the disk 322 to cause the disk 322 to turn from the first position in a first direction, until the disk 322 is prevented from further turning by the limiter 360. As a result, the slot-shutter 332 rotates out of the light path from the interrupter LED 352 to the interrupter opto-transistor 354. Also, the indicator mark 338 appearing in the window rotates out of sight, thereby providing a visual indication of proper phase energization and phase rotation sequence.

While light from the interrupter LED 352 shines on the interrupter opto-transistor 354, the opto-transistor 354 is energized and acts like a conducting switch, effectively short-circuiting the base and emitter of the switching transistor 478. As a result, the previously conducting switching transistor 478 switches off, allowing the voltage at the collector of the switching transistor 478 to rise to a level sufficient to turn on the optoisolator LED 480. The light from the now energized optoisolator LED 480 energizes the triac 418 into conduction, completing the circuit path through the starting device relay coil 416, thereby energizing the starting device relay coil 416. As a result, the starting device relay contacts 442, 446, 450, 484 close.

When the starting device relay contacts 442, 446, 450, 484 close, the time-delay capacitor 482 is placed in parallel with the optoisolator LED 480 and charges to the voltage level at the collector of the switching transistor 478. Also, the three line supply phase voltages are applied to the motor 18 through the current windings 452, 454, 456 and the overload relay heaters 460, 462, 464. The motor 18 starts.

Once the current windings 452, 454, 456 are energized, testing of the current phase energization and phase rotation begins. If the current windings 452, 454, 456 are properly energized and the phase rotation is in the proper direction, then the energized current windings 452, 454, 456 produce a torque that tends to turn the disk 322 in the first direction. As a result, the light path from the interrupter LED 352 to the interrupter opto-transistor 354 remains unblocked, the starting device relay coil 416 remains energized, and the motor 18 remains energized. The start switch 16 is now actuated to the off position. So long as the stop switch 22 is not actuated, the overload relay contact 422 remains closed, and the power supply phase energization and phase rotation are as desired, the starting device relay coil 416 remains energized and power is supplied to the motor 18.

In the event that one or more of the phase voltages is absent while the motor 18 is running, the corresponding current windings 452, 454, 456 are deenergized. The remaining energized current windings 452, 454, 456 cease to produce a torque that tends to rotate the disk 322 in the first direction. The spring 366 then acts on the disk 322 to return the disk 322 to the first position.

In the event that the phase rotation sequence reverses, the current windings 452, 454, 456 produce a torque that acts to rotate the disk 322 in a reverse direction and return the disk 322 to the first position.

When the disk 322 returns to the first position, the slot-shutter 332 enters the interrupter slot 356 and blocks the light path from the interrupter LED 352 to the interrupter opto-transistor 354, thereby turning off the opto-transistor 354. The switching transistor 478 then turns on, providing a path for the time-delay capacitor 480 to discharge through the fourth normally open starting device relay contact 484, the switching transistor 478, and the resistor 474. If the phase energization or phase rotation condition that caused the switching transistor 478 to turn on does not abate within a predetermined time, then the time-delay capacitor 482 discharges to a voltage level sufficient to turn off the optoisolator LED 480. In turn, the triac 418 switches off, thereby deenergizing the starting device relay coil 416 and causing the starting device relay contacts 442, 446, 450, 484 to open. Power to the motor 18 is thereby removed, thus protecting the motor 18 from further possible damage.

Adjustment of either of the embodiments of the apparatus of the present invention is very simple: if the phase rotation of the power supply is negative, then two of the wires at the input terminals may be interchanged; and, if it is desired to change the direction of rotation of the motor, then two of the wires at the output terminals of the apparatus, where they connect to the input terminals of the motor, may be interchanged.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. An apparatus for starting and protecting a three-phase motor, said motor having three motor input lines each having a motor line current therein when said motor is operating, said motor coupled to a three-phase power supply having three power supply output voltages having a spaced phase relationship, comprising:

a positive phase sequence starter and current phase monitor coupled between said motor and said power supply for detecting phase energization and phase rotation of said power supply output voltages and for providing electrical connection of said motor to said power supply only if said phase energization of said power supply output voltages is normal and said phase rotation of said power supply output voltages is in a predetermined direction, and for monitoring phase energization and phase rotation of said motor line currents and maintaining said electrical connection only if said phase energization of said motor line currents is normal and said phase rotation of said motor line currents is in the predetermined direction;

said positive phase sequence starter and current phase monitor including at least one means for producing a mechanical indication of said power supply output voltages phase energization and phase rotation and said motor phase line currents energization and phase rotation, said means for producing connected to said motor and to said power supply; and at least one means for sensing said mechanical indication; wherein said connection of said motor to said power supply is responsive to said means for sensing.

2. The apparatus of claim 1 wherein said means for producing comprises:

an electrically conductive disk mounted for rotation about an axle; and at least three coils, each coil having at least a voltage winding coaxial with a ferromagnetic core, each said voltage winding having a first terminal connected to a respective one of the three phases of said power supply and a second terminal, each of said second terminals adapted for temporary electrical connection to the other of said second terminals;

said coils mounted adjacent and substantially perpendicularly to said disk, said coils disposed substantially equidistant radially outwardly from said axle, said coils disposed substantially equidistant circumferentially apart;

whereby said voltage windings produce a torque in response to said power supply output voltages that tends to cause said disk to rotate in a first direction when said power supply output voltages phase energization is normal and said power supply output voltages phase rotation is in said predetermined direction.

3. The apparatus of claim 1 wherein said means for producing comprises:

an electrically conductive disk mounted for rotation about an axle; and at least three coils, each coil having at least a current winding coaxial with a ferromagnetic core, each said current winding connected in series with a respective one of each of the three motor input lines;

said coils mounted adjacent and substantially perpendicularly to said disk, said coils disposed substantially equidistant radially outwardly from said axle, said coils disposed substantially equidistant circumferentially apart;

whereby said current windings produce a torque in response to said motor line currents that tends to cause said disk to rotate in a first direction when said motor line currents phase energization is normal and said motor line currents phase rotation is in said predetermined direction.

4. The apparatus of claim 1 wherein:

said means for producing comprises a slot-shutter extending therefrom;

said means for sensing comprises an interrupter having a light source for producing light, a light detector for detecting said light, and a slot separating said light source from said light detector by a predetermined distance; and said slot is adapted to receive said slot-shutter therein for selectively preventing said light detector from detecting said light from said light source.

5. The apparatus of claim 1 wherein said means for producing comprises:

an electrically conductive disk mounted for rotation about an axle; and at least three coils, each coil having at least a voltage winding and a current winding coaxial with a ferromagnetic core, each said voltage winding having a first terminal connected to a respective one of the three phases of said power supply and a second terminal, each of said second terminals adapted for temporary electrical connection to the other of said second terminals, each said current winding connected in series with a respective one of each of the three motor input lines;

said coils mounted adjacent and substantially perpendicularly to said disk, said coils disposed substantially equidistant radially outwardly from said axle, said coils disposed substantially equidistant circumferentially apart;

whereby said voltage windings produce a first torque in response to said power supply output voltages that tends to cause said disk to rotate in a first direction when said power supply voltages phase energization is normal and said power supply output voltages phase rotation is in said predetermined direction; and whereby said current windings produce a second torque in response to said motor line currents that tends to cause said disk to rotate in said first direction when said motor line currents phase energization is normal and said motor line currents phase rotation is in said predetermined direction.

6. The apparatus of claim 5 wherein:

said means for producing comprises a slot-shutter extending from said disk;

said means for sensing comprises an interrupter having a light source for producing light, a light detector for detecting said light, and a slot separating said light source from said light detector by a predetermined distance; and said slot is adapted to receive said slot-shutter therein for selectively preventing said light detector from detecting said light from said light source.

7. The apparatus of claim 1 wherein:

said positive phase sequence starter and current phase monitor comprises a positive phase sequence starting control device operably coupled between said power supply and a current phase energization and phase rotation monitor operably coupled between said positive phase sequence starting control device and said motor;

said positive phase sequence starting control device is adapted for detecting said phase energization and said phase rotation of said power supply output voltages and for providing said electrical connection of said power supply to said current phase energization and phase rotation monitor and to said motor only if said phase energization of power supply voltages is normal and said phase rotation of said power supply voltages is in said predetermined direction;

said current phase energization and phase rotation monitor is adapted for detecting said phase energization and said phase rotation of said motor line currents and for maintaining said electrical connection of said power supply to said motor only if said phase energization of said motor line currents is normal and said phase rotation of said motor line currents is in said predetermined direction.

8. The apparatus of claim 7 wherein said means for producing comprises:

a first aluminum disk mounted for rotation about a first axle;

at least three voltage coils, each voltage coil having a voltage winding coaxial with a ferromagnetic core, each said voltage winding having a first terminal connected to a respective one of the three phases of said power supply and a second terminal, each of said second terminals adapted for temporary electrical connection to the other of said second terminals;

said voltage coils mounted adjacent and substantially perpendicularly to said first disk, said voltage coils disposed substantially equidistant radially outwardly from said first axle, said voltage coils disposed substantially equidistant circumferentially apart;

a second aluminum disk mounted for rotation about a second axle;

at least three current coils, each said current coil having a current winding coaxial with a ferromagnetic core, each said current winding connected in series with a respective one of the three motor input lines;

said current coils mounted adjacent and substantially perpendicularly to said second disk, said current coils disposed substantially equidistant radially outwardly from said second axle, said current coils disposed substantially equidistant circumferentially apart;

whereby said voltage coils produce a first torque in response to said power supply output voltages that tends to cause said first disk to rotate in a first direction when said power supply output voltages phase energization is normal and said power supply output voltages phase rotation is in said predetermined direction; and whereby said current coils produce a second torque in response to said motor line currents that tends to cause said second disk to rotate in a second direction when said motor line currents phase energization is normal and said motor line currents phase rotation is in said predetermined direction.

9. The apparatus of claim 8 wherein:

said means for producing comprises a first slot-shutter extending from said first disk and a second slot-shutter extending from said second disk;

said means for sensing comprises a first interrupter having a first light source for producing light, a first light detector for detecting said light from said first light source, and a first slot separating said first light source from said first light detector by a first predetermined distance;

said means for sensing comprises a second interrupter having a second light source for producing light, a second light detector for detecting said light from said second light source, and a second slot separating said second light source from said second light detector by a second predetermined distance;

said first slot is adapted to receive said first slot-shutter therein for selectively preventing said first light detector from detecting said light from said first light source; and said second slot is adapted to receive said second slot-shutter therein for selectively preventing said second light detector from detecting said light from said second light source.

10. A method for starting and protecting a three-phase motor, said motor having three motor input lines each having a motor line current therein when said motor is operating, said motor coupled to a three-phase power supply having three power supply output voltages having a space phase relationship, comprising the steps of:

a) providing a first mechanical indication of the phase energization and phase rotation of said power supply output voltages;

b) sensing said first mechanical indication;

c) energizing said motor only if said phase energization of said power supply output voltages is normal and said phase rotation of said power supply output voltages is in a predetermined direction;

d) providing a second mechanical indication of the phase energization and phase rotation of said motor line currents;

e) sensing said second mechanical indication;

f) maintaining energization of said motor only if said phase energization of said motor line currents is normal and said phase rotation of said motor line currents is in said predetermined direction;

g) repeating steps d) through f) so long as said phase energization of said motor line currents is normal and said phase rotation of said motor line currents is in said predetermined direction; and h) deenergizing said motor if either said motor line currents phase energization is not normal or said motor line currents phase rotation is not in said predetermined direction.

11. The method of claim 10 wherein said step of providing a first mechanical indication comprises rotating a first electrically conductive disk in a first direction when said phase energization of said power supply output voltages is normal and said phase rotation of said power supply output voltages is in said predetermined direction.

12. The method of claim 10 wherein said step of sensing said first mechanical indication comprises detecting rotation of a first electrically conductive disk in a first direction when said power supply output voltages energization condition is normal and said power supply output voltages phase rotation is in said predetermined direction.

13. The method of claim 10 wherein said step of providing a second mechanical indication comprises rotating a second electrically conductive disk in a second direction when said phase energization of said motor line currents is normal and said phase rotation of said motor line currents is in said predetermined direction.

14. The method of claim 10 wherein said step of sensing said second mechanical indication comprises detecting rotation of a second electrically conductive disk in a second direction when said motor line currents energization condition is normal and said motor line currents phase rotation is in said predetermined direction.

15. The method of claim 10 wherein:

said step of providing a first mechanical indication comprises rotating a first aluminum disk in a first direction when said phase energization of said power supply output voltages is normal and said phase rotation of said power supply output voltages is in said predetermined direction;

said step of sensing a first mechanical indication comprises detecting said rotation of said first disk in said first direction;

said step of providing a second mechanical indication comprises rotating a second aluminum disk in a second direction when said phase energization of said motor line currents is normal and said phase rotation of said motor line currents is in said predetermined direction; and said step of sensing said second mechanical indication comprises detecting said rotation of said second disk in said second direction.

16. Apparatus for supplying power to a three-phase electric motor comprising:

three input terminals for reception of three-phase electric power, three ouput terminals for supplying said three-phase electric power to said motor, three relay contacts for selectively transferring said three-phase electric power from said input terminals to said output terminals, a first disk mounted for rotation between a first position and a second position, a first spring for biasing said first disk into said first position, a first set of three electric coils connected for sampling said three-phase power being transferred from said input terminals to said output terminals and mounted for developing corresponding torques in said first disk, said torques being mechanically combined to act in opposition to said first spring and force said first disk into said second position when said three-phase power comprises three phases having a first predetermined relationship, and a first switch responsive to the position of said first disk for operating said relay contacts to assume a first state.

17. Apparatus according to claim 16, said first state being an open state, said apparatus further comprising:

a second disk mounted for rotation between a third position and a fourth position, a second spring for biasing said second disk into said third position, a second set of three electric coils connected for sampling three-phase power available at said input terminals and mounted for developing corresponding torques in said second disk, said torques being mechanically combined to act in opposition to said second spring and force said second disk into said fourth position when said three-phase power comprises three phases having a second predetermined relationship, and a second switch responsive to a positioning of said second disk in said fourth position for operating said relay contacts to assume a closed state.

18. Apparatus according to claim 16 wherein said first disk is a generally circular aluminum disk.

19. Apparatus according to claim 18 wherein said first switch comprises:

a light emitter, a photoelectric sensor positioned for generating an electrical signal in response to light generated by said light emitter, a projection mounted on said first disk for selectively blocking light travel from said light emitter to said photoelectric sensor, and circuit means for enabling said electrical signal to operate said relay contacts.

20. Apparatus according to claim 19 wherein said first switch further comprises:

circuit means for delaying operation of said relay contacts by said electrical signal.

* * * * *